United States Patent
Takeda et al.

(10) Patent No.: US 10,154,479 B2
(45) Date of Patent: Dec. 11, 2018

(54) USER TERMINAL, BASE STATION AND RADIO COMMUNICATION METHOD

(71) Applicant: NTT DOCOMO, INC., Tokyo (JP)

(72) Inventors: Kazuaki Takeda, Tokyo (JP); Hiroki Harada, Tokyo (JP); Hiroyuki Ishii, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 118 days.

(21) Appl. No.: 14/910,318

(22) PCT Filed: Jul. 18, 2014

(86) PCT No.: PCT/JP2014/069146
§ 371 (c)(1),
(2) Date: Feb. 5, 2016

(87) PCT Pub. No.: WO2015/019825
PCT Pub. Date: Feb. 12, 2015

(65) Prior Publication Data
US 2016/0192334 A1     Jun. 30, 2016

(30) Foreign Application Priority Data

Aug. 8, 2013 (JP) .............................. 2013-165507
Mar. 20, 2014 (JP) .............................. 2014-058178

(51) Int. Cl.
*H04W 72/04*     (2009.01)
*H04W 48/16*     (2009.01)
(Continued)

(52) U.S. Cl.
CPC ........ *H04W 72/042* (2013.01); *H04B 17/318* (2015.01); *H04W 16/32* (2013.01);
(Continued)

(58) Field of Classification Search
CPC .................................................. H04W 52/0245
See application file for complete search history.

(56) References Cited

U.S. PATENT DOCUMENTS

2007/0191053 A1*   8/2007   Suzuki .................. H04W 52/40
                                                                                                                          455/522
2012/0142328 A1    6/2012   Awoniyi et al.
(Continued)

FOREIGN PATENT DOCUMENTS

EP          2590442 A1    5/2013
WO     2012/070823 A2    5/2012
(Continued)

OTHER PUBLICATIONS

Extended European Search Report issued in the counterpart European Patent Application No. 14833978.1, dated Jun. 7, 2017 (16 pages).
(Continued)

*Primary Examiner* — Shukri Taha
(74) *Attorney, Agent, or Firm* — Osha Liang LLP

(57) ABSTRACT

The present invention is designed to adequately control small cells (small base stations) on/off in a structure where small cells and macro cells are arranged to overlap each other. A user terminal can communicate with a macro base station that forms a macro cell and a small base station that forms a small cell arranged within the macro cell, and has a measurement section that measures the received power of a detection/measurement signal that is transmitted from the small base station in a predetermined subframe, and the total received power of downlink signals in a subframe in which no detection/measurement signal is transmitted, a calculation section that calculates received quality by using the received power and the total received power, and a transmission section that transmits information related to the received quality to the macro base station, the calculation (Continued)

section calculates the received quality based on the proportion of the received power and the value given by adding the received power to the total received power.

3 Claims, 11 Drawing Sheets

(51) Int. Cl.
    *H04B 17/318*     (2015.01)
    *H04W 16/32*     (2009.01)
    *H04W 52/02*     (2009.01)
    *H04W 84/04*     (2009.01)

(52) U.S. Cl.
    CPC ....... *H04W 48/16* (2013.01); *H04W 52/0206* (2013.01); *H04W 72/0413* (2013.01); *H04W 84/045* (2013.01); *Y02D 70/00* (2018.01); *Y02D 70/1242* (2018.01); *Y02D 70/1262* (2018.01); *Y02D 70/1264* (2018.01); *Y02D 70/25* (2018.01)

(56) References Cited

U.S. PATENT DOCUMENTS

| | | | |
|---|---|---|---|
| 2013/0021929 A1* | 1/2013 | Kim | H04B 7/024 370/252 |
| 2013/0033998 A1* | 2/2013 | Seo | H04W 24/00 370/252 |
| 2013/0225188 A1 | 8/2013 | Seo et al. | |
| 2014/0177601 A1* | 6/2014 | Nishio | H04W 24/10 370/332 |
| 2014/0192671 A1* | 7/2014 | Lim | H04W 24/08 370/252 |
| 2014/0335869 A1* | 11/2014 | Choi | H04W 36/0072 455/438 |
| 2015/0103683 A1* | 4/2015 | Kim | H04W 24/02 370/252 |

FOREIGN PATENT DOCUMENTS

| | | |
|---|---|---|
| WO | 2012164853 A1 | 12/2012 |
| WO | 2013151404 A1 | 10/2013 |

OTHER PUBLICATIONS

Office Action issued in the counterpart Japanese Patent Application No. 2014-058178, dated Sep. 13, 2016 (11 pages).
International Search Report issued in PCT/JP2014/069146 dated Oct. 7, 2014 (4 pages).
Written Opinion of the International Searching Authority issued in PCT/JP2014/069146 dated Oct. 7, 2014 (4 pages).
3GPP TR 36.814 V9.0.0; "3rd Generation Partnership Project; Technical Specification Group Radio Access Network; Evolved Universal Terrestrial Radio Access (E-UTRA); Further advancements for E-UTRA physical layer aspects (Release 9)"; Mar. 2010 (104 pages).
3GPP TS 36.300 V11.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Dec. 2012 (208 pages).
Partial Supplementary European Search Report dated Mar. 1, 2017, in corresponding European Patent Application No. 14833978.1 (9 pages).
ZTE, 3GPP TSG RAN WG1 Meeting #73, "Interference Analysis on Small Cell On/Off Switching," R1-132089, Fukuoka, Japan, May 20-24, 2013 (3 pages).

* cited by examiner

USER TERMINAL, BASE STATION AND RADIO COMMUNICATION METHOD

TECHNICAL FIELD

The present invention relates to a base station, a user terminal and a radio communication method in a next-generation mobile communication system.

BACKGROUND ART

In a UMTS (Universal Mobile Telecommunications System) network, the specifications of long-term evolution (LTE) have been drafted for the purposes of further increasing high-speed data rates, providing low delay and so on (non-patent literature 1). In LTE, as multiple access schemes, a scheme that is based on OFDMA (Orthogonal Frequency Division Multiple Access) is used in downlink channels (downlink), and a scheme that is based on SC-FDMA (Single-Carrier Frequency Division Multiple Access) is used in uplink channels (uplink).

Also, successor systems of LTE (referred to as, for example, "LTE-advanced" or "LTE enhancement" (hereinafter referred to as "LTE-A")) have been under study for the purpose of achieving further broadbandization and increased speed beyond LTE. In the LTE-A system, a HetNet (Heterogeneous Network), in which small cells (for example, pico cells, femto cells and so on) having a local coverage area of a radius of approximately several tens of meters are formed inside a macro cell having a wide coverage area of a radius of approximately several kilometers, is under study (see, for example, non-patent literature 2). Also, in relationship to the HetNet, a study is in progress to use carriers of different frequency bands between the macro cell (macro base station) and the small cells (small base stations), in addition to the same frequency band.

CITATION LIST

Non-Patent Literature

Non-Patent Literature 1: 3GPP TS 36.300 "Evolved UTRA and Evolved UTRAN Overall Description"
Non-Patent Literature 2: 3GPP TR 36.814 "E-UTRA Further Advancements for E-UTRA Physical Layer Aspects"

SUMMARY OF INVENTION

Technical Problem

In the above HetNet, many small cells may be placed in the macro cell. In this case, it may be possible to arrange small cells in a localized manner in places where the traffic is heavy, so as to achieve an off-loading effect between the cells. Also, from the perspective of saving power over the network and reducing the interference against neighboring cells, it is preferable to make small cells (small base stations) with a light traffic load among a plurality of small cells stop transmitting signals and assume an off state (or a DTX state).

If small cells (small base stations) are controlled to be switched on/off, the transition from the on state to the off state (or DTX) may be decided by monitoring the small cells' traffic from the network side. On the other hand, the transition from the off state to the on state needs to be controlled by adequately identifying the traffic that is produced in off-state small cell areas. However, since the DL signals (reference signals, data signals, etc.) that are normally transmitted during the on state are not transmitted from off-state small base stations, how to control the transition of off-state small cells to the on state raises the problem.

The present invention has been made in view of the above, and it is therefore an object of the present invention to provide a radio communication method, a user terminal and a base station, whereby, in a structure in which small cells and macro cells are arranged to overlap each other, the small cells (small base stations) can be adequately controlled on/off.

Solution to Problem

One aspect of a user terminal according to the present invention provides a user terminal that can communicate with a macro base station that forms a macro cell and a small base station that forms a small cell arranged within the macro cell, and that has a measurement section that measures received power of a detection/measurement signal that is transmitted from the small base station in a predetermined subframe, and total received power of a downlink signal in a subframe in which the detection/measurement signal is not transmitted, a calculation section that calculates received quality by using the received power and the total received power, and a transmission section that transmits information related to the received quality to the macro base station, and, in this user terminal, the calculation section calculates the received quality based on a proportion of the received power and a value given by adding the received power to the total received power.

Advantageous Effects of Invention

According to the present invention, it is possible to adequately control small cells (small base stations) on/off in a structure where small cells and macro cells are arranged to overlap each other.

DESCRIPTION OF EMBODIMENTS

Figure 1:
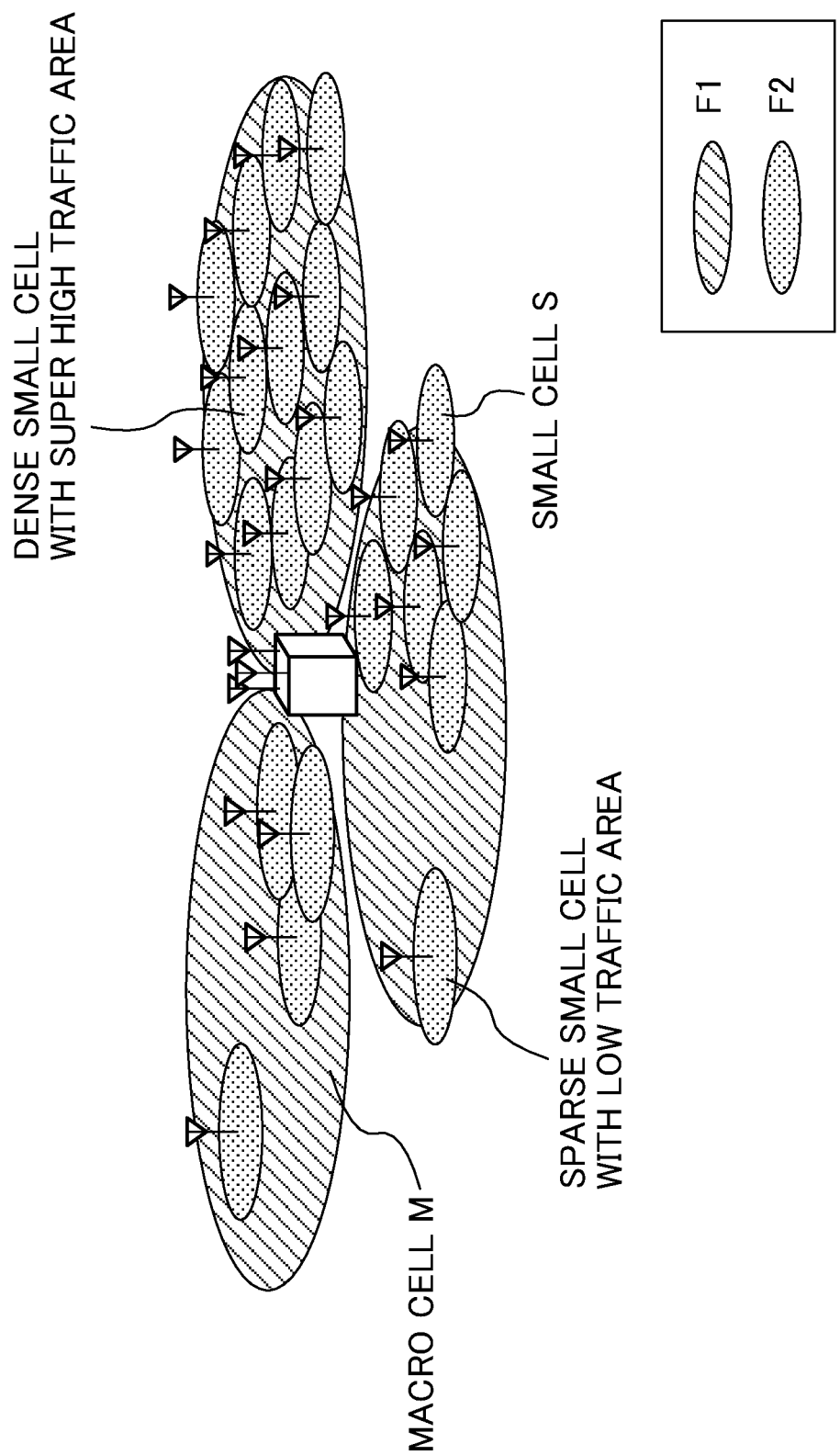
FIG. 1 is a conceptual diagram of a HetNet.

FIG. 1 is a conceptual diagram of the HetNet that is assumed in Rel. 12 and later versions. As shown in FIG. 1, a HetNet refers to a radio communication system in which macro cells and small cells are arranged to overlap each other geographically at least in part. A HetNet is comprised of a radio base station that forms a macro cell (hereinafter referred to as a "macro base station"), radio base stations that form small cells (hereinafter referred to as "small base stations"), and a user terminal that communicates with the macro base station and the small base stations.

As shown in FIG. 1, in macro cells M, a carrier F1 (hereinafter referred to as the "low frequency band carrier") of a relatively low frequency band—for example, 800 MHz or 2 GHz—is used. On the other hand, in a plurality of small cells S, a carrier F2 (hereinafter referred to as the "high frequency band carrier") of a relatively high frequency band—for example, 3.5 GHz—is used. Note that 800 MHz, 2 GHz and 3.5 GHz are only examples. 3.5 GHz may be used for the carrier for the macro cells M, and 800 MHz, 2 GHz, 1.7 GHz and others may be used for the carrier for the small cells S.

In this way, a scenario (separate frequencies) to employ different frequencies between a small cell S and a macro cell M is under study for a radio communication system for LTE-A (Rel. 12 and later versions). In this case, it may be possible to use the macro cell M and the small cell S, which use different frequencies, simultaneously, by means of CA (carrier aggregation).

Now, generally speaking, the distribution of users and traffic are not fixed, but change over time or between locations. Consequently, when many small cells are placed in a macro cell, the small cells may be arranged in such a manner that their density and environment vary (sparse and dense) between locations, as shown in above FIG. 1.

For example, it may be possible to raise the density of placing small cells (dense small cells) in train stations, shopping malls and so on where many user terminals gather, and lower the density of placing small cells (sparse small cells) in places where user terminals do not gather. As shown in FIG. 1, by placing small cells densely and in a localized manner (that is, in clusters) in places where the traffic is heavy, it is possible to achieve an off-loading effect between the cells. On the other hand, when small cells are placed in a high density, the impact of interference grows between the cells due to DL signals transmitted from neighboring cells.

Figure 2:
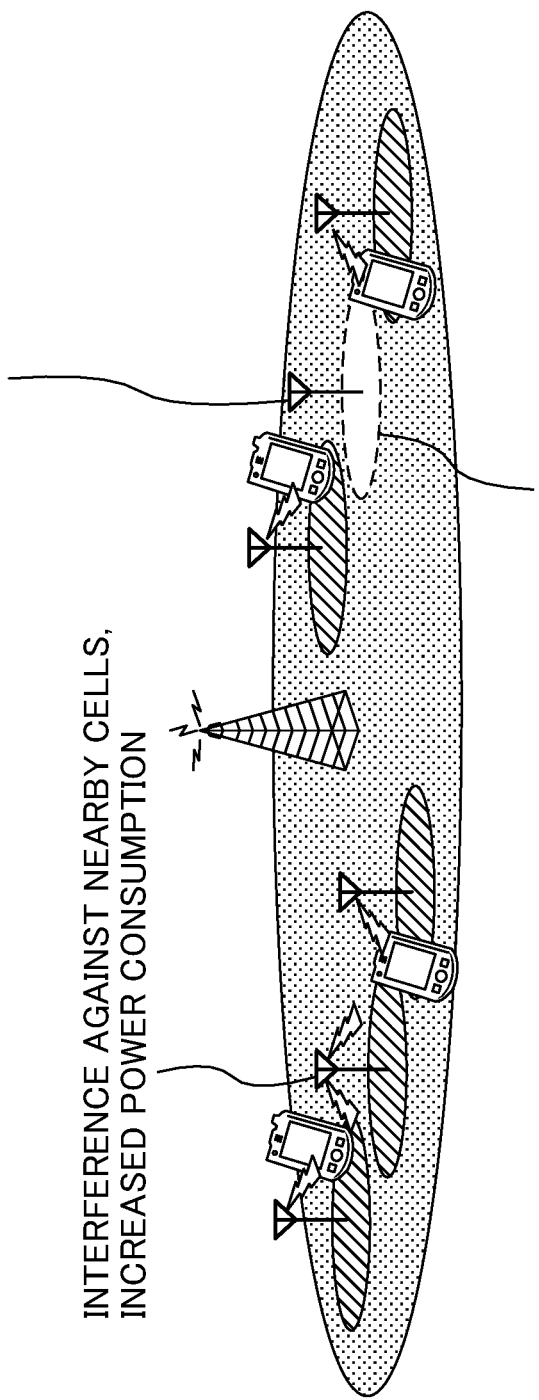
FIG. 2 is a diagram to explain an example case where part of a plurality of small cells is placed in an off state.

Also, assuming a structure in which a plurality of small cells (small base stations) are placed within a macro cell, a study is in progress to switch on/off and control each small cell depending on the traffic load of the small cell. For example, as shown in FIG. 2, it may be possible to place a small cell where the load of traffic is light in the off state (including the DTX state).

The small base station, having transitioned to the off state, does not transmit DL signals (for example, the cell-specific reference signal (CRS)) and so on, so that it is possible to reduce the interference against neighboring small cells. Also, sine a small base station with a light traffic load (for example, there is no traffic) is placed in the off state, it is possible to achieve reduced power consumption (energy saving).

Furthermore, in order to maximize the energy saving and the effect of reducing interference against other cells, a study is in progress to dynamically control small cells on/off. For example, by controlling small cells (small base station) on/off in predetermined transmission time interval units (for example, subframes), it is possible to reduce interference and achieve energy saving more effectively.

When switching on/off and controlling small cells (small base stations), the transition from the on state to the off state (including the DTX state) may be decided by monitoring traffic from the network side. On the other hand, the transition from the off state to the on state needs to be carried out by identifying the traffic that is produced in off-state small cells. However, since the DL signals (reference signals, data signals, etc.) that are normally transmitted during the on state are not transmitted from off-state small base stations, how to control the transition of off-state small cells to the on state raises the problem.

As the method of allowing transition from the off state to the on state, the present inventors have worked on a method of transmitting specific DL signals (also referred to as "detection/measurement signals," "discovery signals," etc.) from small cells in the off state (which includes the DTX state) and making decisions based on the detection/measurement results of these DL signals in user terminals. To be more specific, a user terminal which has received a detection/measurement signal (discovery signal) from a small cell measures the received state of this detection/measurement signal and sends a report to the network (for example, a macro base station). Then, based on this measurement result, the macro base station decides whether or not to let this small cell transition to the on state.

Figure 3A:
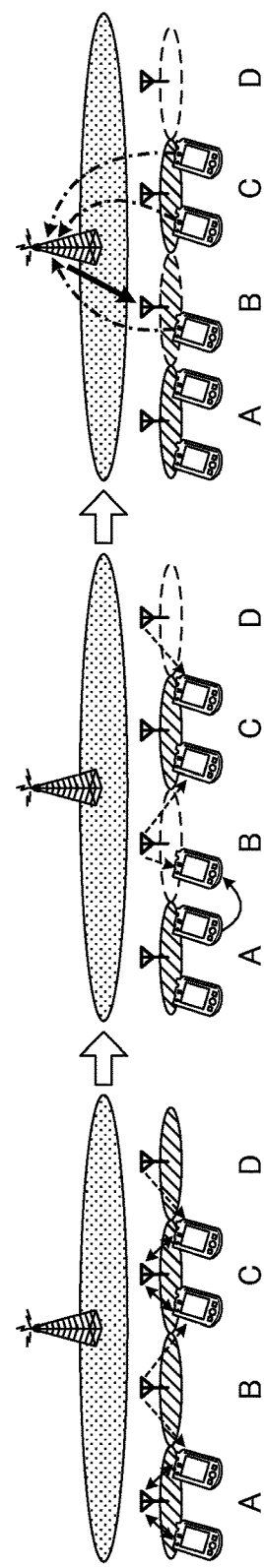
FIG. 3 provides diagrams to explain an example of the procedure of operation in small cell on/off control.
Figure 3B:
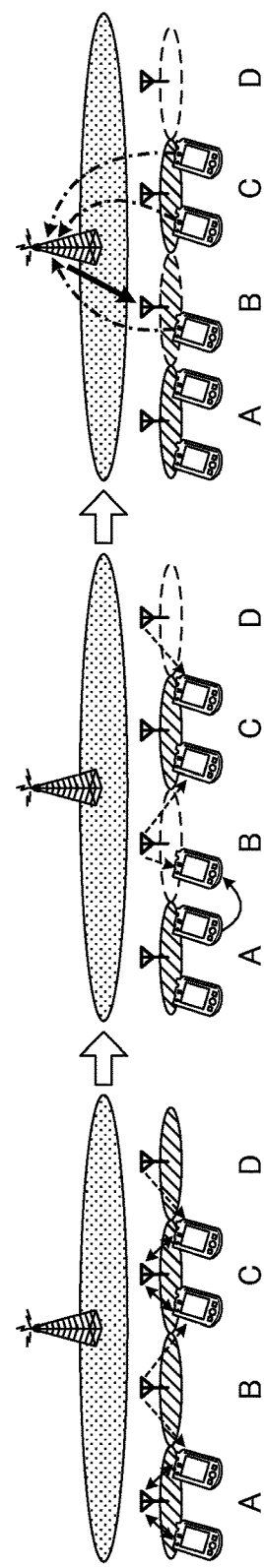
Figure 3C:
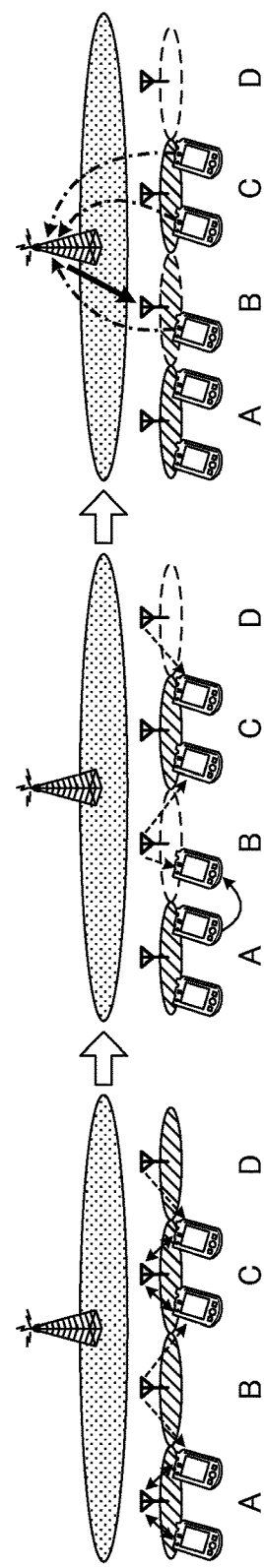

FIGS. 3A to 3C show an example of the operation of a radio communication system during the off state (or the DTX state). Note that, in the following description, when a small base station (small cell) is in the off state, this refers to the state in which the small base station (small cell) can receive UL signals from user terminals, and transmits detection/measurement signals for measurement use in a long cycle. That is to say, the off state includes the DTX state as well. Also, when a small base station is in the on state, this refers to the state in which the small base station carries out communication in the same way existing base stations do (legacy carriers). That is, a small base station in the on state transmits DL signals such as downlink reference signals including the cell-specific reference signal (CRS) and so on, data signals, control signals and so on, on a per subframe basis. On the other hand, a small base station in the DTX state transmits DL signals only in a predetermined period (for example, N ms), in a predetermined cycle (for example, L ms), not on a per subframe basis (see FIG. 3D).

First, among a plurality of small cells, small cells which carry no traffic and which create no coverage hole even if switched off (that is, the coverage is secured by the macro cell and so on) transition to the off state (DTX state) (see FIGS. 3A and 3B). For example, small cells with no traffic are placed in the off state (DTX state) based on decisions by the network (for example, the macro base station). Information can be transmitted and received between the macro base station and the small base stations via a backhaul link (optical fiber, X2 signaling, etc.).

On-state small cells transmit cell-specific reference signals (CRSs) and so on even when there is no traffic, and therefore become a source of interference against neighboring cells. Consequently, by placing small cells which have no traffic and which therefore do not need to carry out DL transmission in the off state (DTX state), it is possible to reduce the interference against neighboring cells and achieve reduced power consumption.

FIG. 3A and FIG. 3B show a case where the small base station B and D transition to the off state (DTX state). In this case, the reference signals (CRSs) and so on that are transmitted from the small base stations B and D on a per subframe basis stop, so that it is possible to reduce the interference against the small base stations A and C. Note that the small base stations having transitioned to the off state (DTX state) transmit detection/measurement signals (discovery signals) in a long cycle (see FIG. 3B). When a user terminal detects the detection/measurement signals, the user terminal measures the received state of these signals, and transmits the measurement result to the network (for example, the macro base station) in the form of a measurement report (MR).

Figure 3D:
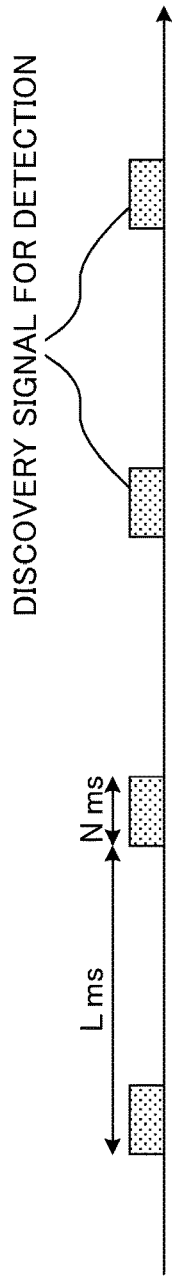

In FIG. 3B, detection/measurement signals are transmitted from the small base stations B and D in the DTX state. For example, as shown in FIG. 3D, detection/measurement signals are transmitted from the small base stations B and D, during a given period (for example, N ms), in a given cycle (for example, L ms). By transmitting detection/measurement signals in synchronization from a plurality of small base stations, the user terminals can carry out detection and measurements efficiently.

Based on the MRs reported from the user terminals, the macro base station decides whether or not to let the small base station in the DTX state transition to the on state (see FIG. 3C). FIG. 3C shows a case where the small base station B transitions from the DTX state to the on state.

Note that the DTX operation in the small base stations is preferably designed such that
(1) the transmission cycle is long and one transmission time is short so as to improve the energy saving effect,
(2) the time of detection/measurement signals and so on are reported to the user terminals so as to allow the user terminals to carry out the detection/measurement operation effectively, and
(3) detection/measurement signals are transmitted from each small base station in synchronization so as to allow the user terminals to detect and measure a plurality of nearby small cells together.

Figure 4A:
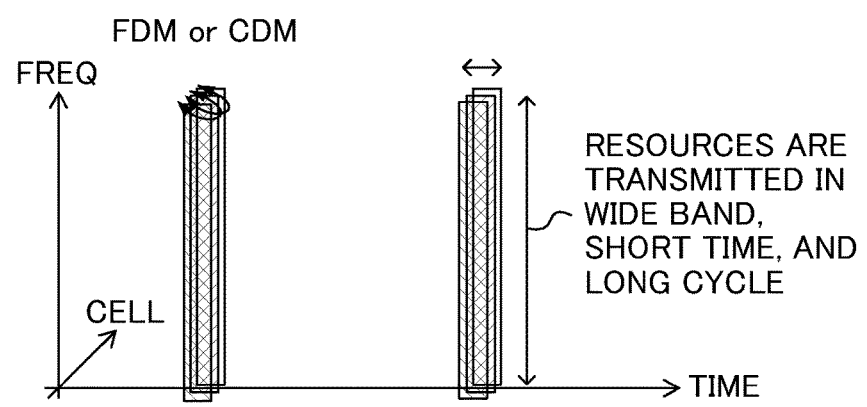
FIG. 4 provides diagrams to show examples of DL signals transmitted from small cells.

When the detection/measurement signals fulfill the above requirements, the detection/measurement signals transmitted from the small cells have high orthogonality, the transmission cycle is long, one transmission time is short and the resource density is sufficiently high (see FIG. 4A). When the detection/measurement signals have a high resource density, the user terminals can carry out the detection and measurements with high accuracy, during one transmission time. Note that, when "the resource density is sufficiently high," for example, signals are allocated to a wide band and therefore can reduce the impact of fading.

Figure 4B:
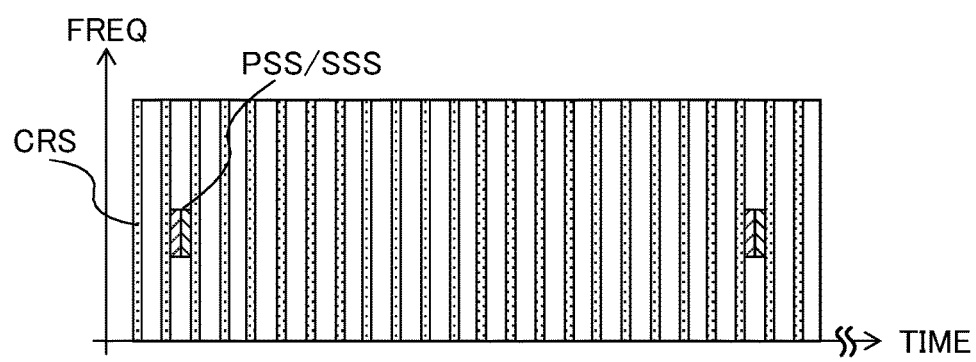

As shown in FIG. 4A, the detection/measurement signals are transmitted from small base stations in the DTX state, in predetermined subframes. Meanwhile, FIG. 4B show an example arrangement pattern of DL signals (in FIG. 4B, cell-specific reference signals (CRSs) and synchronization signals (SSs)) transmitted from on-state small base stations. Note that, when detection/measurement signals are transmitted from small base stations in the DTX state, it is preferable to stop the CRSs and so on that are transmitted from the on-state small cells.

A user terminal, by detecting/measuring the detection/measurement signals (discovery signals) transmitted from the small cells in the DTX state, can identify the small cells in the DTX state, measure received quality, and report the measurement results. If the measurement results (MRs) from the user terminal are good, the network (for example, the macro base station) lets the small cells in the DTX state transition to the on state, and furthermore let the user terminals connect with the small base stations Now, it may be possible to use received power (RSRP) and/or received quality (RSRQ) as a measurement result (MR) to report from the user terminals to the macro base station. RSRP refers to the received power of reference signals from the measurement target cell (for example, a specific small cell). RSRQ refers to the ratio (proportion) of RSRP and the total received power (RSSI) in a user terminal in a given subframe. If the measurement target cell shows higher received power, the RSRP and the RSRQ increase. Also, when the total received power is lower (when the pertaining band is less crowded), the RSRQ increases. By this means, the RSRQ which a user terminal determines is represented, theoretically, by equation 1. Note that equation 1 represents a case where one antenna port's CRS is presumed and taken into account based on one RB (normalized over one RB). Note that equation 1 is an example, and the present embodiment is by no means limited to this.

$$RSRQ = \frac{S}{2 \times S + 10 \times load_S \times S_{Data\_subframe} + 2 \times I + 10 \times load_I \times I + 12 \times N} \quad \text{(Equation 1)}$$

where:
S: the received power (RSRP) corresponding to the CRS signal of the target cell;
$load_S$: the load of traffic in the target cell;
$S_{Data\_Subframe}$: the received power corresponding to the data signal of the target cell;
I: interference component from nearby cells;
$load_I$: the load of traffic in nearby cells; and
N: noise.

As described above, in existing systems, received quality (RSRQ) can be determined as the ratio between RSRP and RSSI (RSRQ=RSRP/RSSI). Existing systems (Rel. 8 to 11) provide for measuring RSRP and RSRQ (RSSI) in subframes containing cell-specific reference signals (CRSs). Consequently, in the detection/measurements of detection/measurement signals (discovery signals), it may be possible to determine RSRP and RSRQ (RSSI), as in existing systems, by using subframes containing the detection/measurement signals instead of CRSs.

However, if RSSI is measured in subframes in which the detection/measurement signals are transmitted, since the detection/measurement signals alone are transmitted in these subframes in synchronization, RSSI becomes the total received power of the detection/measurement signals from each small cell. As a result of this, DL signals that are transmitted from other small base stations (for example, on-state small base stations) are not taken into account in RSSI. Consequently, when RSRQ is calculated based on the proportion of this RSSI and RSRP, the RSRP does not reflect the degree of traffic jam accurately.

On the other hand, when RSSI is measured in subframes in which no detection/measurement signal is transmitted, if many of the cells near a user terminal are small cells in the off or the DTX state, the RSSI value becomes near zero. As a result, if RSRQ is calculated as the proportion of this RSSI and RSRQ, the RSRQ value diverges, which makes it difficult to calculate accurate received quality.

The present inventors have conceived of calculating received quality (RSRQ) accurately by taking into account both the received power (RSRP) in subframes in which the detection/measurement signals are transmitted, and the total received power (RSSI) in subframes in which the detection/measurement signals are not transmitted. Also, the present inventors have conceived of reporting the received SINR of the detection/measurement signals from a user terminal to a macro base station, and, on the macro base station side, controlling small cells on/off based on this SINR and the volume of buffer. By this means, it is possible to adequately control small cells (small base stations) on/off, taking into account the traffic in small cell areas in the off state (DTX state).

Now, the present embodiment will be described below in detail with reference to the accompanying drawings.

First Example

A case will be described here with a first example where received quality (RSRQ) is determined by taking into account both the period in which detection/measurement signals (discovery signals) are transmitted and the period in which the detection/measurement signals are not transmitted. Note that a case will be shown with the following description where the period in which detection/measurement signals are transmitted and the period in which these signals are not transmitted are taken into account in subframe units.

Figure 5:
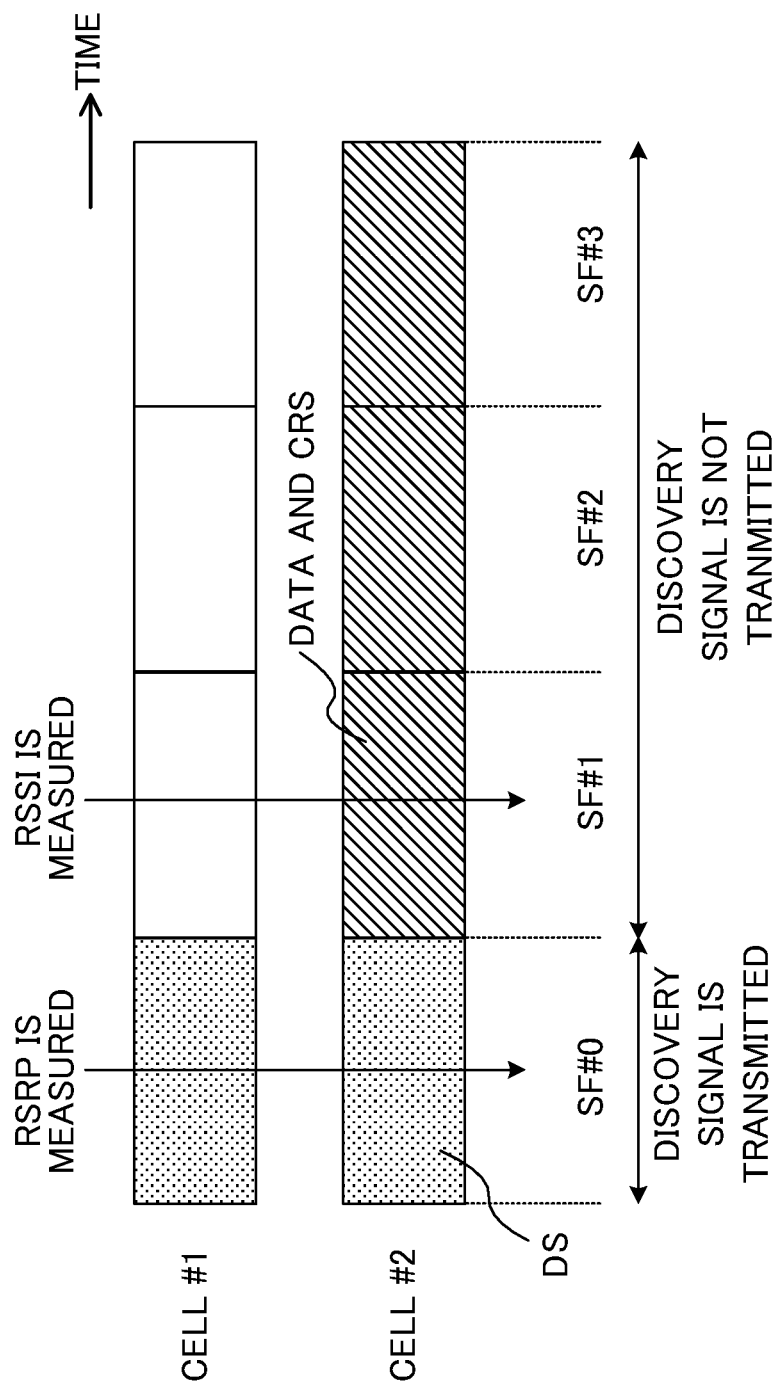
FIG. 5 is a diagram to show examples of DL signals transmitted from a plurality of small cells in each subframe.

FIG. 5 is a diagram to show examples of DL signals transmitted respectively from a small base station (cell #1) in the off state (DTX state) and a small base station (cell #2) in the on-state, in each subframe. To be more specific, FIG. 5 shows a case where the detection/measurement signals are transmitted from cell #1 and cell #2 in a subframe 0 (SF #0), and data signals, reference signals (CRS) and so on are transmitted from cell #2 in subframes 1 to 3 (SFs #1 to #3). That is, in subframes 1 to 3 (SFs #1 to #3), no DL signal is transmitted from cell #1.

A case will be described below in which a user terminal measures the RSRP and RSRQ (RSSI) of the target cell. Note that the followings description will be given with reference to a case where cell #1 (small cell in the DTX state) in FIG. 5 is the target cell.

First, the user terminal measures received power (RSRP) by using the detection/measurement signal. Here, the user terminal measures the received power of the detection/measurement signal transmitted from a small cell (cell #1) in the subframe 0 (SF #0). Note that a case is presumed with the subframe 0 where no reference signal (CRS) or data signal is transmitted from a nearby cell 2 (cell #2).

Next, the user terminal measures the total received power (RSSI) in a subframe in which no detection/measurement signal is transmitted. Here, in a subframe 1 (SF #1), the user terminal measures the total received power of DL signals transmitted from each small cell (cell #1 and cell #2). Note that, although reference signals (CRS), data signals and so on are transmitted from the nearby cell 2 (cell #2) in the subframe 1 (SF #1), no signal is transmitted from small cells in the DTX state (for example, cell #1).

Although a case has been described with FIG. 5 where a user terminal measures the total received power (RSSI) in the subframe 1 (SF #1), the subframe for measuring RSSI is by no means limited to this. The user terminal may measure RSSI in other subframes (for example, SFs #2 and SF #3) where no detection/measurement signal is transmitted.

The user terminal, having measured the RSRP in SF #0 and the RSSI in SF #1, determines the received quality (RSRQ) using these RSRP and RSSI. With the present embodiment, the RSRQ is calculated by using the RSRP and the RSSI such that the RSRQ is given in the same form as the RSRQ that is determined by using existing CRSs, and reported to the network (for example, the macro base station).

To be more specific, a user terminal calculates the RSRQ based on the proportion (ratio) of the received power (RSRP$_{DS}$) of a subframes in which the detection/measurement signal is transmitted, and the value given by adding this RSRP$_{DS}$ to the total received power (RSSI) of a subframe in which the detection/measurement signal is not transmitted. That is, the user terminal can determine RSRQ=RSRP$_{DS}$/(RSRP$_{DS}$+RSSI).

The RSRQ the user terminal determines thus can be theoretically represented by equation 2. Note that equation 2 represents a case where the CRS of one antenna port is presumed and taken into account based on one RB (case of normalization over one RB). Note that equation 2 is an example and the present embodiment is by no means limited to this.

$$RSRQ = \frac{S_{DS\_subframe}}{2 \times S_{DS\_subframe} + 10 \times \text{load}_S \times S_{Data\_subframe} + 2 \times I + 10 \times \text{load}_I \times I + 12 \times N} \quad \text{(Equation 2)}$$

where:

$S_{DS\_subframe}$: the received power (RSRP) corresponding to the discovery signal of the target cell;

load$_S$: the load of traffic in the target cell;

$S_{Data\_Subframe}$: the received power corresponding to the data signal of the target cell;

I: interference components from nearby cells;

load$_I$: the load of traffic in nearby cells; and

N: noise.

Note that "10×load$_S$×S$_{Data\_subframe}$+2×I+10×Load$_I$×I+12×N" in the denominator of equation 2 corresponds to a theoretical formula of the RSSI which the user terminal actually measures in the subframe 1 (SF #1) of FIG. 5. Also, "2×S$_{DS\_subframe}$" corresponds to the received power (RSRP) where the CRS from cell #1 is presumed in SF #1. That is, with above equation 2, presuming a case where the CRS (the CRS of two resource elements in one RB) is transmitted from the target cell in the DTX state in SF #1, the received power of the detection/measurement signal is added to the RSSI that is actually measured in SF #1.

As clear from the theoretical equations 1 and 2, given RSRQ=RSRP$_{DS}$/(RSRP$_{DS}$+RSSI), the RSRQ of the detection/measurement signal can be calculated in the same form as the RSRQ (existing system) that is calculated from a subframe in which the CRS is transmitted. As a result of this, when RSRQ is used in cell selection and so on, it is possible to make a relative comparison of the RSRQ that is calculated by using the CRS and the RSRQ that is calculated by using the detection/measurement signal, so that adequate cell selection can be made between macro cells and small cells.

As described above, when RSSI is measured in a subframe in which no detection/measurement signal is transmitted, the proportion of the value given by adding the received power (RSRP$_{DS}$) of the detection/measurement signal to that RSSI, and the received power (RSRP$_{DS}$), is taken into account. By this means, it is possible to reflect the level of congestion in the band adequately, and, even when many of the cells near a user terminal are small cells in the DTX state, determine the RSRQ value adequately. As a result of this, the macro base station can adequately decide whether or not to let the small base stations in the DTX state transition to the on state, based on the RSRQ reported from the user terminal and so on.

<Variation 1>

Note that a case has been shown in the above description where a user terminal determines received quality (RSRQ) by using the received power (RSRP) of a subframe in which the detection/measurement signal is transmitted, and the total received power (RSSI) of a subframe in which the detection/measurement signal is not transmitted, and sends a report to the macro base station. However, the present embodiment is by no means limited to this, and it is equally possible to report information related to total received power (RSSI) itself from the user terminal to the macro base station as a MR.

For example, the user terminal reports information related to the RSRP measured in the subframe 0 (SF #0) and the RSSI measured in one of the subframes 1 to 3 (SF #1 to #3) in above FIG. 5, to the macro base station. By using the RSRP and the RSSI reported from the user terminal, the macro base station, execute on/off control (transition from the off state (DTX state) to the on state).

At this time, the macro base station generates a metric flexibly by using the RSRP and the RSSI acquired from the user terminal, and, using this metric, controls the small cells on/off. For example, RSRQ such as that shown in above equation 2 can be determined on the macro base station side.

Alternatively, it is equally possible to generate a new metric (see following equation 3) in the macro base station and decide whether or not to place small base stations in the DTX state in the on state. In equation 3, the RSRQ is calculated using different methods for small cells in the on state and those in the off state. By using following equation 3, it becomes possible to learn more accurate RSRQ depending on on/off.

$$RSRQ_i = \begin{cases} \dfrac{RSRP_i}{RSRP_i + RSSI} & \text{if cell } i \text{ is off} \\ \dfrac{RSRP_i}{RSSI} & \text{else if cell } i \text{ is on} \end{cases} \quad \text{(Equation 3)}$$

where:
 $RSRP_i$: the RSRP of i cell; and
 $RSRQ_i$: the RSRQ of i cell.

By using above equation 3 in the macro base station, it becomes possible to select cells using the SINR.

<Variation 2>

Also, a case has been shown with the above description where small cells (small base stations) are switched on/off for control. However, the present embodiment is not limited to this, and small cells may stay "on" at all times as well. In this case, provided that the small cells transmit CRSs on a per subframe basis, the RSSI takes into account the impact of the CRSs, and, even if RSRQ=RSSP/RSSI, it is still possible to prevent the situation where the RSRQ value diverges.

The network (for example, the macro base station, small base stations, etc.) may report information for switching between a plurality of measurements (measurement switching information) to user terminals via a higher layer signal or a broadcast signal.

For example, the network may report information for switching between equations for calculating the RSRQ (for example, RSRQ=RSRP/RSSI and RSRQ=RSRP$_{DS}$/(RSRP$_{DS}$+RSSI)) as measurement switching information. Also, the network may report information regarding whether or not to include the RSRP in the denominator of the equation for calculating the RSRQ, to user terminals. Note that the measurement switching information may be information which directly represents the measurement method, or, if user terminals memorize a plurality of measurements methods in advance, may be information which indirectly represents the measurement method (the numerical value to correspond to the measurement method).

A user terminal, by switching the measurement based on the measurement switching information, can determine the RSRQ adequately, taking into account the impact of reference signals such as CRSs. For example, the user terminal can calculate the RSRQ by including the RSRP in the denominator of the equation for calculating the RSRQ, based on the measurement switching information.

Second Example

A case will be described with a second example where a user terminal determines the SINR (Signal to Interference plus Noise power Ratio) by using detection/measurement signals, and reports this SINR to the network (for example, a macro base station) as an MR.

In a subframe in which detection/measurement signals are transmitted, a user terminal measures the received SINR of the detection/measurement signals. For example, in the subframe 0 (SF #0) in above FIG. 5, the user terminal measures the received SINR of the detection/measurement signal that is transmitted from a small cell (cell #1). By using the detection/measurement signal, the user terminal can determine a more accurate SINR. Also, the user terminal reports the measured SINR to the network (macro base station) as an MR.

The macro base station carries out on/off control of small base station in the DTX state considering the SINR reported from the user terminal. At this time, the macro base station takes into account the volume of data that remains in the small cells connected via a backhaul link (hereinafter also referred to as "the volume of buffer"). The volume of buffer is the volume of data to transmit to user terminals, so that it is possible to consider traffic adequately by using this volume of buffer.

For example, when the traffic condition starts jamming, the macro base station decides to switch small cells on. The macro base station selects, for a user terminal that has reported the SINR of the detection/measurement signal, a small base station having an SINR equal to or higher than a predetermined value and having a low buffer volume, and makes this small base station transition to the on state.

In this way, the macro base station uses the received SINR of detection/measurement signals reported from user terminals and the buffer volume in small cells, so that it is possible to adequately take into account the traffic in off-state (DTX state) small cell areas, and control small base stations on/off adequately.

Third Example

Although examples have been shown with the above-described first and second examples where a user terminal measures the RSRP, RSSI, SINR and so on in subframe units, this is by no means limiting. To be more specific, if small cells transmit detection/measurement signals in part of a subframe, a user terminal might measure the RSRP, RSSI, SINR and so on in OFDM symbol units. A case will be described with a third example where a user terminal carries out measurements in OFDM symbol units.

In a subframe in which detection/measurement signals are transmitted, a user terminal measures the RSRP by using the detection/measurement signal corresponding to the measurement target cell. In this case, in a subframe in which detection/measurement signals are transmitted, the user terminal may measure the RSSI in an OFDM symbol in which no detection/measurement signal is included, or the user terminal may measure the RSSI in a subframe in which no detection/measurement signal is transmitted.

For example, if the received power of the detection/measurement signal is $RSRP_{DS}$, the equation to calculate the RSRQ which the user terminal determines can be represented by $RSRQ=RSRP_{DS}/(RSRP_{DS}+RSSI)$, provided that the RSSI is measured in an OFDM symbol in which no detection/measurement signal is included. On the other hand, when the RSSI is measured in a subframe in which no detection/measurement signal is transmitted, the equation to calculate the RSRQ which the user terminal determines can be represented by $RSRQ=RSRP_{DS}/(RSRP_{DS}+RSSI)$. No matter which equation is used for calculation, the theoretical equation of the RSRQ can be represented by theoretical equation 4. By calculating the RSRQ in this way, it is possible to reflect the level of congestion in the band adequately even when small cells transmit detection/measurement signals in part of a subframe. Also, even when many cells near a user terminal are small cells in the DTX state, the denominator of theoretical equation 4 is prevented from becoming very close to zero, so that the RSRQ value can be determined adequately. Note that theoretical equation 4 is only an example, and the equation for calculating the RSRQ is by no means limited to this.

$$RSRQ = \frac{S_{DS\_symbol}}{2 \times S_{DS\_symbol} + 10 \times \text{load}_S \times S_{Data\_symbol} + 2 \times I + 10 \times \text{load}_I \times I + 12 \times N} \quad \text{(Equation 4)}$$

where:

$S_{DS\_Symbol}$: the received power corresponding to OFDM symbols including the discovery signal of the target cell (RSRP);

$\text{load}_S$: the load of traffic in the target cell;

$S_{Data\_Symbol}$: the received power corresponding to OFDM symbols including the data signal of the target cell;

I: interference component from nearby cells;

$\text{load}_I$: the load of traffic in nearby cells; and

N: noise.

Figure 11:
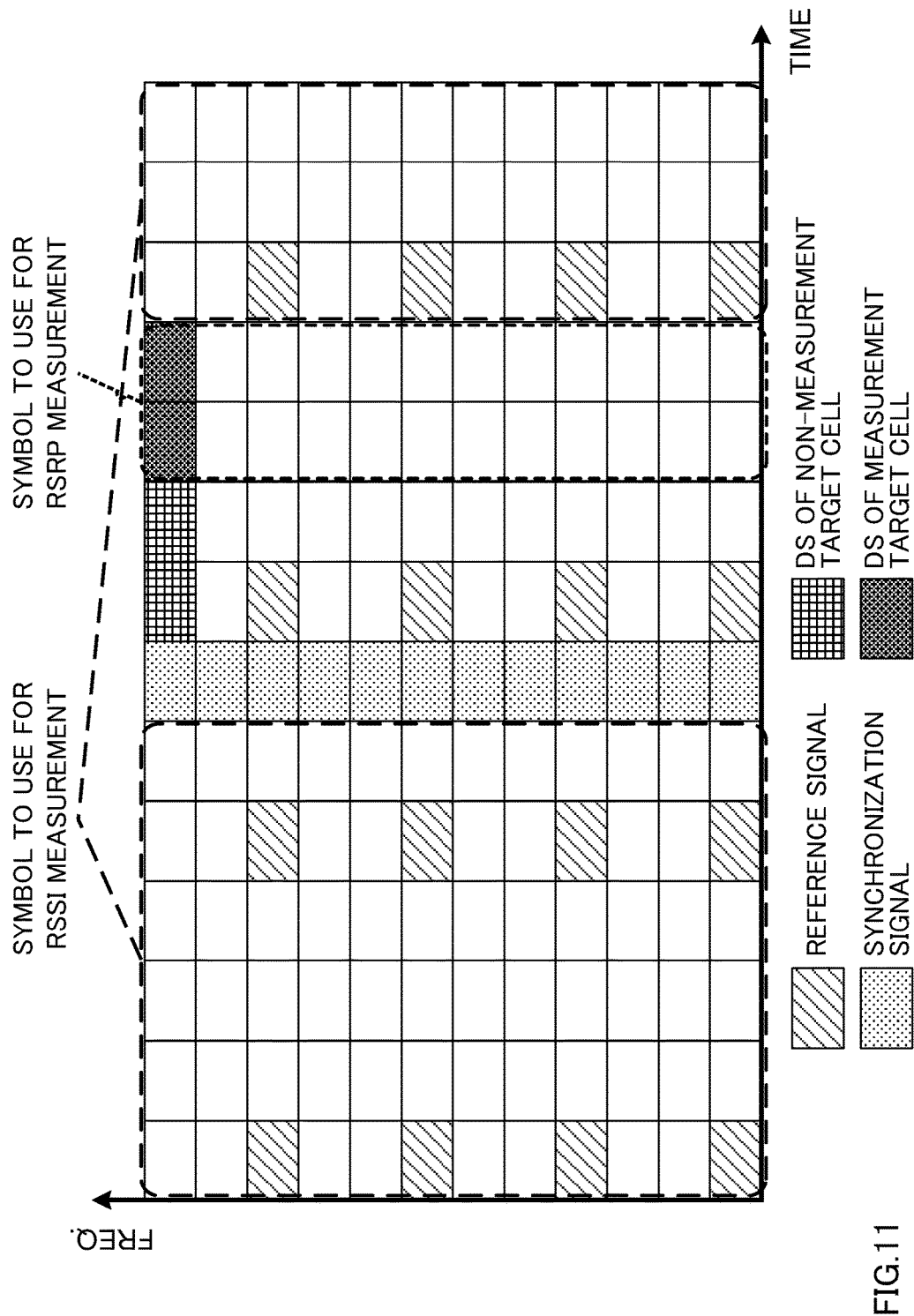
FIG. 11 is a diagram to show examples of DL signals transmitted from a plurality of small cells in a given subframe.

FIG. 11 is a diagram to show examples of DL signals transmitted from a plurality of small cells in a given subframe. FIG. 11 shows one RB (resource block), which is the minimum radio resource unit for frequency scheduling. In FIG. 11, reference signals (for example, CRSs) are arranged in the zeroth, third, sixth and ninth subcarriers in the zeroth, fourth, seventh and eleventh symbols. Also, synchronization signals (for example, PSSs) are arranged in the sixth symbol. Also, the detection/measurement signal (DS) of a non-measurement-target cell is arranged in the eleventh subcarriers of the seventh and eighth symbols. Also, the detection/measurement signal (DS) of a measurement target cell is arranged in the eleventh subcarriers of the ninth and tenth symbols.

In FIG. 11, a user terminal measures the RSRP using the DS of the measurement target cell. Also, the user terminal can measure the RSSI in symbols (the zeroth to fifth and the eleventh to thirteenth symbols) in which neither the DS of a measurement target cell nor the DS of a non-measurement-target cell is included. Note that it is equally possible to include the sixth symbol carrying the synchronization signal in the RSSI measurement, and measure the RSSI in the zeroth to sixth and the eleventh to thirteenth symbols.

Note that, in a subframe in which detection/measurement signals are transmitted, the user terminal may measure the RSRP using the detection/measurement signal corresponding to the measurement target cell, while determining the RSSI in all of the OFDM symbols in the subframe in which detection/measurement signals are transmitted.

With the configuration according to the third example of the present invention, when detection/measurement signals are transmitted in part of a subframe, it is possible to measure the RSRP, RSSI, SINR and so on within one subframe, and determine the RSRQ value adequately.

Note that, not only in the above-described second variation, but also in the third example, too, the network (for example, the macro base station, small base stations, etc.) may report information for switching the measurement (measurement switching information) to user terminals by means of a higher layer signal or a broadcast signal. For example, information for switching the equation for calculating the RSRQ may be reported. Also, a user terminal may be configured to decide whether to carry out measurements using detection/measurement signals in subframe units or in symbol units, based on the measurement switching information.

Also, the integer value of each constant included in the denominators of theoretical equations 1, 2 and 4 depends on the number of antenna ports. For example, it is possible to use an equation in which the number of subcarriers of reference signals (for example, CRSs) allocated to one symbol in one RB (twelve subcarriers) is "a." In this case, the equation for calculating the RSRQ can be made, for example, $RSRQ=RSRP_{DS}/(a \cdot RSRP_{DS}+(12-a) \cdot RSSI)$.

(Structure of Radio Communication System)

Now, a structure of a radio communication system according to the present embodiment will be described below. In this radio communication system, the above radio communication methods according to the first, second and third examples are employed. Note that the above radio communication methods according to the first, second and third examples may be applied individually or may be applied in combination.

Figure 6:
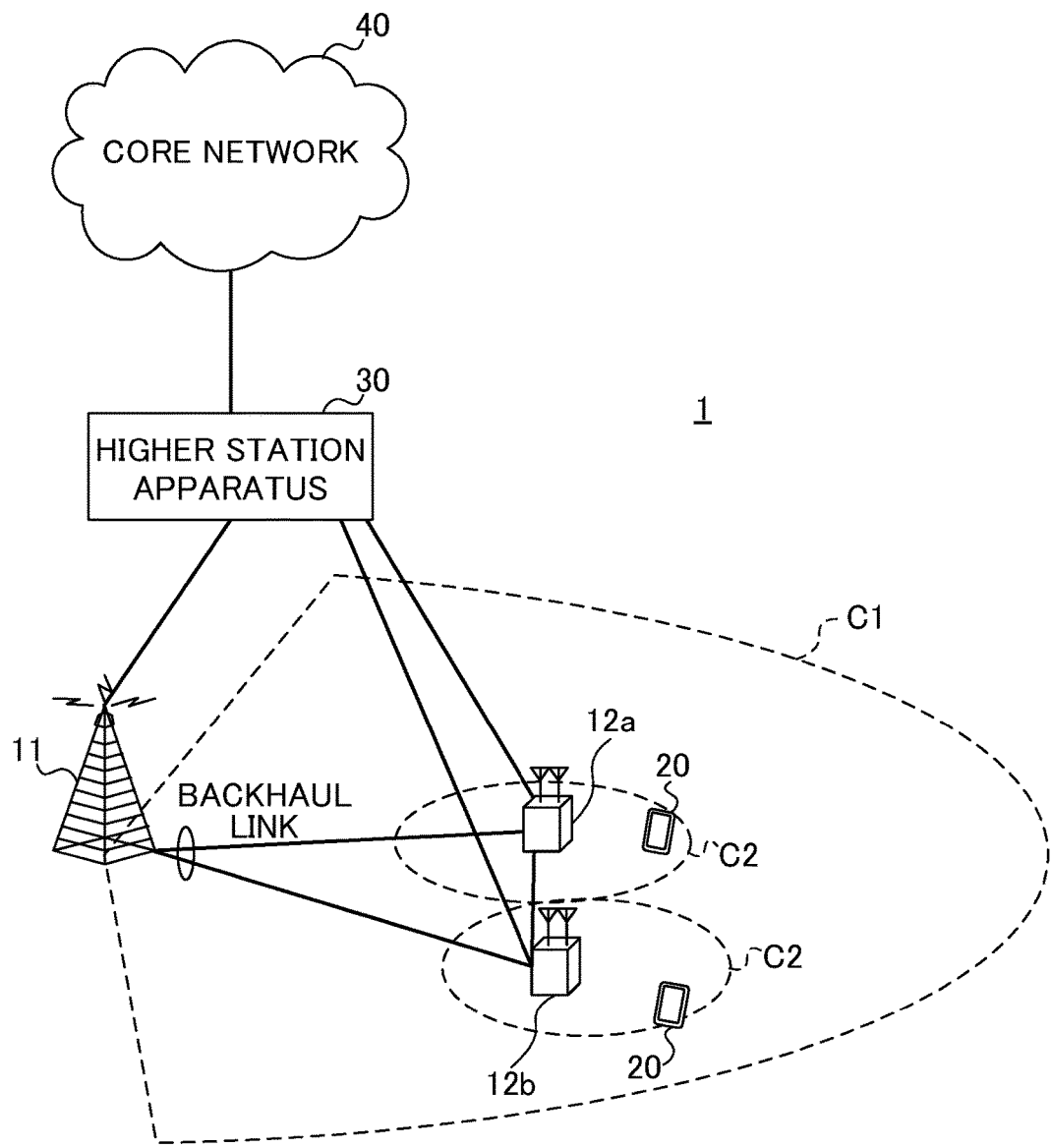
FIG. 6 is a schematic diagram to show an example of a radio communication system according to the present embodiment.

FIG. 6 is a schematic configuration diagram of a radio communication system according to the present embodiment. As shown in FIG. 6, the radio communication system 1 includes a macro base station 11, which forms a macro cell C1, and small base stations 12a and 12b, which are placed in the macro cell C1 and which form small cells C2 that are narrower than the macro cell C1. The user terminals 20 are configured to be capable of carrying out radio communication with at least one of the macro base station 11 and the small base stations 12a and 12b (hereinafter collectively referred to as "small base stations 12"). Note that the number of the macro base station 11 and the small base stations 12 is by no means limited to the number illustrated in FIG. 6.

In the macro cell C1 and the small cells C2, the same frequency band may be used, or different frequency bands may be used. Also, the macro base station 11 and each small base station 12 are connected with each other via an inter-base station interface (for example, optical fiber, X2 interface, etc.). The macro base station 11 and the small base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these.

Note that the macro base station 11 is a radio base station having a relatively wide coverage, and may be referred to as an "eNodeB (eNB)," a "radio base station," a "transmission point" and so on. The small base stations 12 are radio base stations having local coverages, and may be referred to as "RRHs (Remote Radio Heads)," "pico base stations," "femto base stations," "HeNBs (Home eNodeBs)," "transmission points," "eNodeBs (eNBs)," and so on. The user terminals 20 are terminals to support various communication schemes such as LTE, LTE-A and so on, and may include both mobile communication terminals and fixed communication terminals.

Also, in the radio communication system 1, as radio access schemes, OFDMA (Orthogonal Frequency Division Multiple Access) is applied to the downlink, and SC-FDMA (Single-Carrier Frequency Division Multiple Access) is applied to the uplink.

In the radio communication system 1, a downlink shared channel (PDSCH: Physical Downlink Shared Channel), which is used by each user terminal 20 on a shared basis, downlink control channels (PDCCH: Physical Downlink Control Channel, EPDCCH: Enhanced Physical Downlink Control Channel), a PCFICH, a PHICH, a broadcast channel (PBCH) and so on are used as downlink communication channels. User data and higher layer control information are transmitted by the PDSCH. Downlink control information (DCI) is transmitted by the PDCCH and the EPDCCH.

Also, in the radio communication system 1, an uplink shared channel (PUSCH: Physical Uplink Shared Channel), which is used by each user terminal 20 on a shared basis, an uplink control channel (PUCCH: Physical Uplink Control Channel) and so on are used as uplink communication channels. User data and higher layer control information are transmitted by the PUSCH. Also, downlink radio quality information (CQI: Channel Quality Indicator), delivery acknowledgment information (ACKs/NACKs) and so on are transmitted by the PUCCH.

Hereinafter, the macro base station 11 and the small base stations 12 will be collectively referred to as "radio base station 10," unless distinction needs to be drawn otherwise.

Figure 7:
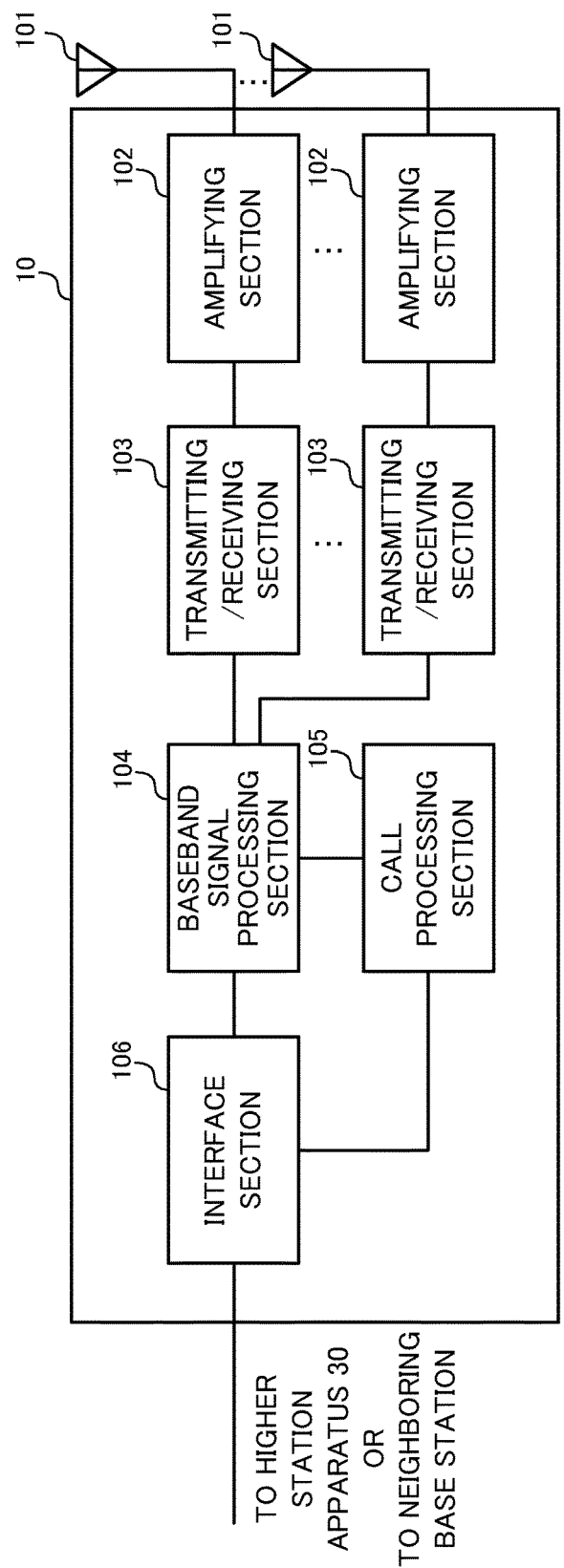
FIG. 7 is a diagram to explain an overall structure of a radio base station according to the present embodiment.

FIG. 7 is a diagram to show an overall structure of a radio base station 10 according to the present embodiment. The radio base station 10 has a plurality of transmitting/receiving antennas 101 for MIMO transmission, amplifying sections 102, transmitting/receiving sections 103, a baseband signal processing section 104, a call processing section 105 and an interface section 106.

User data to be transmitted from the radio base station 10 to a user terminal 20 through the downlink is input from the higher station apparatus 30, into the baseband signal processing section 104, via the interface section 106.

In the baseband signal processing section 104, a PDCP layer process, division and coupling of the user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a pre-coding process are performed, and the result is transferred to each transmitting/receiving section 103. Furthermore, downlink control signals are also subjected to transmission processes such as channel coding and an inverse fast Fourier transform, and are transferred to each transmitting/receiving section 103.

Each transmitting/receiving section 103 converts the downlink signals, which are pre-coded and output from the baseband signal processing section 104 on a per antenna basis, into a radio frequency band. The amplifying sections 102 amplify the radio frequency signals having been subjected to frequency conversion, and transmit the results through the transmitting/receiving antennas 101.

On the other hand, as for uplink signals, radio frequency signals that are received in the transmitting/receiving antennas 101 are each amplified in the amplifying sections 102, converted into baseband signals through frequency conversion in each transmitting/receiving section 103, and input in the baseband signal processing section 104.

In the baseband signal processing section 104, the user data that is included in the input uplink signals is subjected to an FFT process, an IDFT process, error correction decoding, a MAC retransmission control receiving process and RLC layer and PDCP layer receiving processes, and the result is transferred to the higher station apparatus 30 via the interface section 106. The call processing section 105 performs call processing such as setting up and releasing communication channels, manages the state of the radio base station 10 and manages the radio resources.

The interface section 106 transmits and receives signals to and from neighboring radio base stations (backhaul signaling) via an inter-base station interface (for example, optical fiber, X2 interface, etc.). For example, data is transmitted and received between the macro base station 11 and the small base stations 12 via the interface section 106. Alternatively, the interface section 106 transmits and receives signals to and from the higher station apparatus 30 via a predetermined interface.

Figure 8:
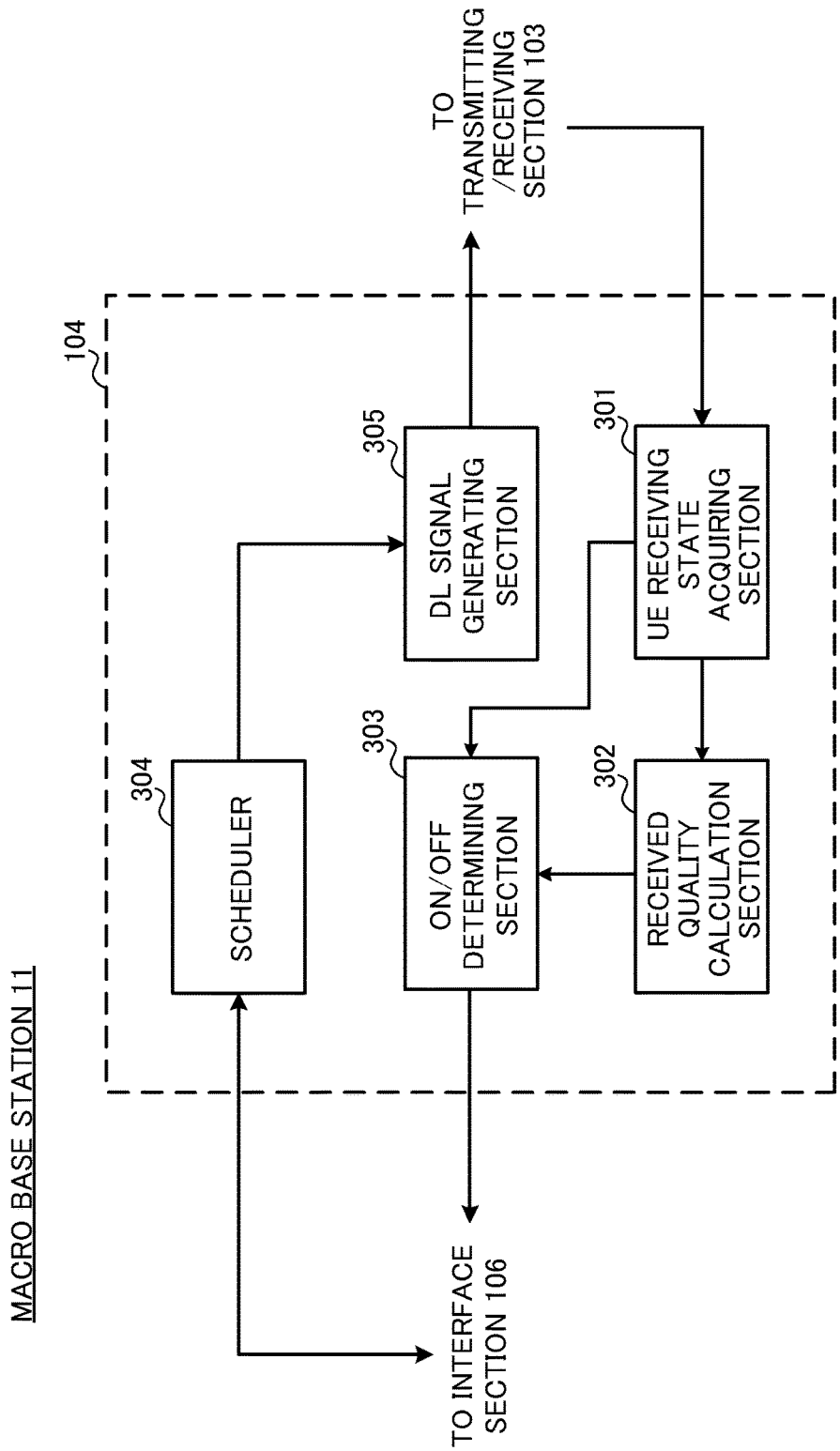
FIG. 8 is a diagram to explain a functional structure of a macro base station according to the present embodiment.

FIG. 8 is a diagram to show a functional structure of a macro base station 11 according to the present embodiment. Note that the following functional structure is formed with the baseband signal processing section 104 provided in the macro base station 11 and so on.

As shown in FIG. 8, the macro base station 11 has a UE receiving state acquiring section 301, a received quality calculation section 302, an on/off determining section 303, a scheduler 304, and a DL signal generating section 305.

The UE receiving state acquiring section 301 acquires information (MR) regarding the receiving state in the user terminal 20 with respect to the detection/measurement signals (discovery signal). Note that an MR is reported from the user terminal 20 that has received a detection/measurement signal (discovery signal) transmitted from a small base station 12. For example, the UE receiving state acquiring section 301 acquires information related to the received power (RSRP) and the received quality (RSRQ) of a detection/measurement signal detected/measured in the user terminal 20, from the user terminal 20 (the above first example).

Also, when the user terminal 20 feeds back information related to the total received power (RSSI) of a subframe in which no detection/measurement signal is transmitted (the above variation of the first example), the UE receiving state acquiring section 301 acquires the RSSI and the received power (RSRP) of the detection/measurement signal. Also, when the user terminal 20 reports the received SINR of a detection/measurement signal (the above second example), the UE receiving state acquiring section 301 receives the SINR from every user terminal 20.

The received quality calculation section 302 calculates the received quality of each user terminal 20 with respect to the detection/measurement signal based on the information acquired in the UE receiving state acquiring section 301. For example, when information related to the received power (RSRP) of a detection/measurement signal and the total received power (RSSI) of a subframe in which no detection/measurement signal is transmitted is reported from the user terminal 20 (the above variation of the first example 1), the received quality calculation section 302 calculates the received quality (RSRQ) using the RSRP and the RSSI.

To be more specific, the received quality calculation section 302 calculates the received quality (RSRQ) based on the proportion (ratio) of the received power (RSRP) and the value given by adding the received power (RSRP) to the total received power (RSSI). At this time, the RSRQ that is calculated in the received quality calculation section 302 can be represented by above equation 2. Also, the received quality calculation section 302 may generate a new metric by using the RSRP and the RSSI received from the user terminal 20. For example, the received quality calculation section 302 can use above equation 3. The result calculated in the received quality calculation section 302 is output to the on/off determining section 303. Note that, if information related to received quality (RSRQ) is directly reported from a user terminal (the above first example), the process in the received quality calculation section 302 can be skipped.

The on/off determining section 303 controls the small base stations on/off based on the information output from the UE receiving state acquiring section 301 and/or the received quality calculation section 302. For example, the on/off determining section 303 determines to let the small base stations in the off state (DTX state) transition to the on state, and sends a report to the small base station via the interface section 106.

To be more specific, when there are a plurality of user terminals 20 where the received quality (RSRQ) of a detection/measurement signal is equal to or greater than a predetermined value, the on/off determining section 303 lets the small base station having transmitted the detection/measurement signal transition to the on state. Alternatively, the on/off determining section 303 selects, for the user terminals having reported the SINR of the detection/measurement signal, a small base station that has an SINR equal to or higher than a predetermined value and that has a low buffer volume, and has it transition to the on state.

The scheduler 304 allocates radio resources for DL signals to transmit to the user terminal 20 (scheduling). For example, the scheduler 304 commands the DL signal generating section 305 to generate DS information related to the detection/measurement signals transmitted from small base stations in the DTX state to the user terminals (the signal structure and the transmission time (transmission cycle, transmission period) of the detection/measurement signals, etc.).

The DL signal generating section 305 generates DL signals based on the command from the scheduler 304. For example, the DL signal generating section 305 generates control signals, data signals, reference signals and so on. Also, the DL signal generating section 305 generates information (DS information) related to the detection/measurement signals transmitted from the small base stations in the DTX state as a higher layer signal or a broadcast signal. The signals generated in the DL signal generating section 305 are transmitted to the user terminal 20 via the transmitting/receiving section 103.

Also, the UE receiving state acquiring section 301 of the macro base station 11 can acquire the received quality (RSRQ) that is calculated by using the received power measured in a subframe where cell-specific reference signals (CRSs) are transmitted, and the total received power, from the user terminal. In this case, a selection section that compares the received quality that is calculated by using the detection/measurement signals and the received quality that is calculated by using the cell-specific reference signals, and selects the cell where the user terminal connects (a macro cell or a small cell) may be further provided in the macro base station 11.

Figure 9:
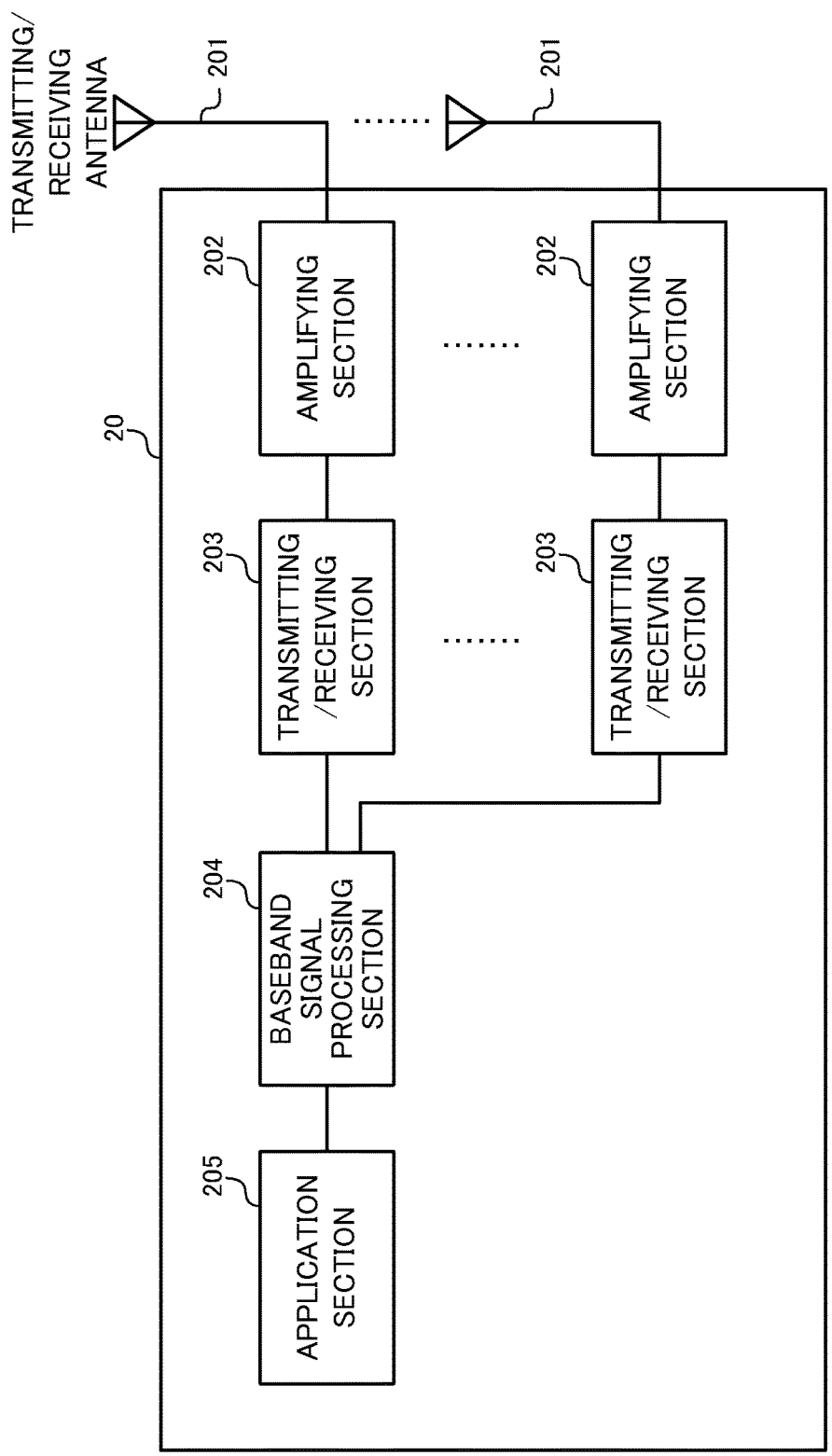
FIG. 9 is a diagram to explain an overall structure of a user terminal according to the present embodiment.

FIG. 9 is a diagram to show an overall structure of a user terminal 20 according to the present embodiment. The user terminal 20 has a plurality of transmitting/receiving antennas 201 for MIMO transmission, amplifying sections 202, transmitting/receiving sections (receiving sections) 203, a baseband signal processing section 204, and an application section 205.

As for downlink data, radio frequency signals that are received in a plurality of transmitting/receiving antennas 201 are each amplified in the amplifying sections 202, and subjected to frequency conversion and converted into baseband signals in the transmitting/receiving sections 203. These baseband signals are subjected to an FFT process, error correction decoding, a retransmission control receiving process and so on, in the baseband signal processing section 204. In this downlink data, downlink user data is transferred to the application section 205. The application section 205 performs processes related to higher layers above the physical layer and the MAC layer, and so on. Also, in the downlink data, broadcast information is also transferred to the application section 205.

Meanwhile, uplink user data is input from the application section 205 into the baseband signal processing section 204. The baseband signal processing section 204 performs a retransmission control (H-ARQ (Hybrid ARQ)) transmission process, channel coding, pre-coding, a DFT process, an IFFT process and so on, and transfers the result to each transmitting/receiving section 203. The baseband signals that are output from the baseband signal processing section 204 are converted into a radio frequency band in the transmitting/receiving sections 203. After that, the amplifying sections 202 amplify the radio frequency signals having been subjected to frequency conversion, and transmit the results from the transmitting/receiving antennas 201.

Figure 10:
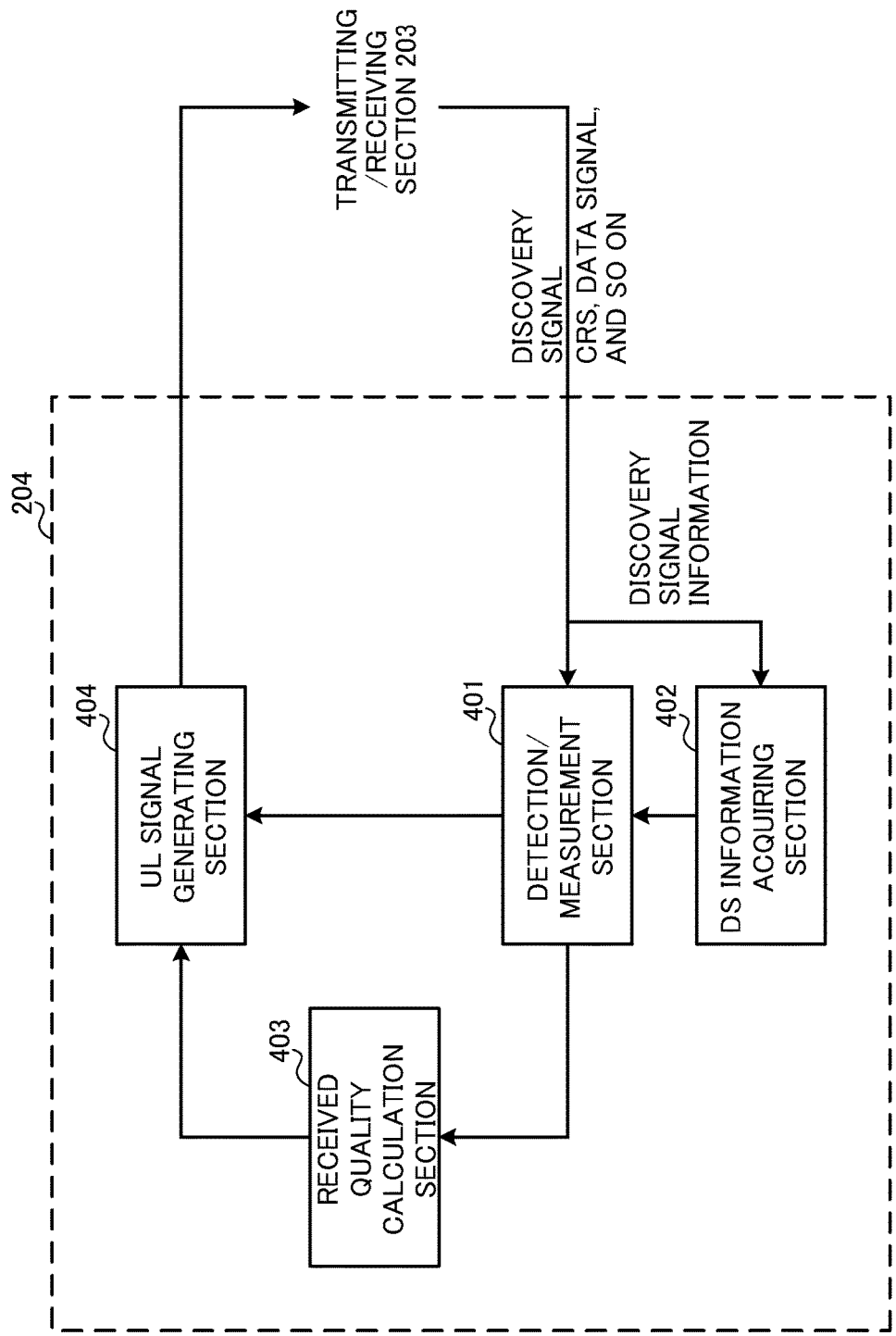
FIG. 10 is a diagram to explain a functional structure of a user terminal according to the present embodiment.

FIG. 10 is a principle functional structure diagram of the baseband signal processing section 204 provided in the user terminal 20. As shown in FIG. 10, the baseband signal processing section 204 provided in the user terminal 20 at least has a detection/measurement section 401, a DS information acquiring section 402, a received quality calculation section 403 and a UL signal generating section 404.

The detection/measurement section 401 detects/measures the DL signals transmitted from the macro base station 11 and/or the small base stations 12. For example, the detection/measurement section 401 measures the received power (RSRP) of a detection/measurement signal transmitted from a small base station in the DTX state in a predetermined subframe, and the total received power (RSSI) of the DL signals in a subframe in which no detection/measurement signal is transmitted. Note that the detection/measurement section 401 can carry out the detection operation efficiently by detecting the detection/measurement signals by using information supplied from the DS information acquiring section 402.

Also, in a subframe in which a detection/measurement signal is transmitted, the detection/measurement section 401 may measure the received SINR of the detection/measurement signal (the above second example).

The DS information acquiring section 402 acquires, from the macro base station 11, DS information related to the detection/measurement signals that are transmitted from small base stations in the DTX state (the signal structure, the transmission time (the transmission cycle and the transmission period) and so on of the detection/measurement signals). The DS information acquiring section 402 specifies the transmission time of the detection/measurement signals based on the DS information received from the macro base station 11, and outputs the result to the detection/measurement section 401.

The received quality calculation section 403 calculates the received quality (RSRQ) using the received power (RSRP) of the detection/measurement signal measured in the detection/measurement section 401 and the total received power (RSSI) of a subframe in which no detection/measurement signal is transmitted. To be more specific, the received quality calculation section 403 calculates the received quality (RSRQ) based on the proportion of the received power (RSRP) and the value given by adding the received power (RSRP) to the total received power (RSSI). At this time, the RSRQ that is calculated in the received quality calculation section 403 can be represented by above equation 2.

Note that, when the user terminal 20 transmits information related to the total received power (RSSI) itself to the macro base station 11 (the above variation of the first example 1), or when the user terminal transmits information related to the SINR of the detection/measurement signal (the above second example), the process in the received quality calculation section 403 can be skipped.

The UL signal generating section 404 generates information (measurement report) related to the received quality (RSRQ) calculated in the received quality calculation section 403 or the received power (RSRP) measured in the detection/measurement section 401 as an uplink signal. Also, when the total received power (RSSI) itself is transmitted (the above variation of the first example 1), or when the received SINR of the detection/measurement signal is transmitted (the above second example), the UL signal generating section 404 generates information related to the RSSI or the SINR as an uplink signal. Also, the UL signal generating section 404 furthermore generates uplink control signals such as delivery acknowledgement signals, and uplink data signals.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way. For example, the examples described herein may be combined and implemented as appropriate.

The disclosures of Japanese Patent Application No. 2013-165507, filed on Aug. 8, 2013, and Japanese Patent Application No. 2014-058178, filed on Mar. 20, 2014, including the specifications, drawings and abstracts are incorporated herein by reference in their entirety.

The invention claimed is:

1. A user terminal comprising:
a receiver that receives a detection/measurement signal transmitted from a given cell;
a processor that measures received power (RSRP: Reference Signal Received Power) of the detection/measurement signal and total received power (RSSI: Reference Signal Strength Indicator) of a downlink signal in a subframe in which the detection/measurement signal is transmitted; and
a transmitter that transmits information about a measurement result,
wherein when the detection/measurement signal is transmitted using a part of symbols in the subframe, the processor measures the RSSI from all OFDM (Orthogonal Frequency Division Multiplexed) symbols of the downlink signal of the subframe in which the detection/measurement signal is transmitted,
wherein the receiver receives information, comprising a measurement timing configuration, about the detection/measurement signal, and
wherein the measurement result is based, at least in part, on the information.

2. A base station comprising:
a transmitter that transmits, in a given cell, a detection/measurement signal to a user terminal by using a part of symbols of a subframe; and
a receiver that receives information about a measurement result of received power (RSRP: Reference Signal Received Power) of the detection/measurement signal measured by the user terminal and total received power (RSSI: Reference Signal Strength Indicator) measured from all OFDM (Orthogonal Frequency Division Multiplexed) symbols of a downlink signal of the subframe in which the detection/measurement signal is transmitted,
wherein the transmitter further transmits information, comprising a measurement timing configuration, about the detection/measurement signal, and
wherein the measurement result is based, at least in part, on the information.

3. A radio communication method for a user terminal, comprising:
receiving a detection/measurement signal transmitted from a given cell;
measuring received power (RSRP: Reference Signal Received Power) of the detection/measurement signal and total received power (RSSI: Reference Signal Strength Indicator) of a downlink signal of a subframe in which the detection/measurement signal is transmitted; and
transmitting information about a measurement result,
wherein when the detection/measurement signal is transmitted using a part of symbols in the subframe, the user terminal measures the RSSI from all OFDM (Orthogonal Frequency Division Multiplexed) symbols of the downlink signal of the subframe in which the detection/measurement signal is transmitted,
wherein the method further comprises: receiving information, comprising a measurement timing configuration, about the detection/measurement signal, and
wherein the measurement result is based, at least in part, on the information.

* * * * *